June 2, 1953   J. JANDASEK   2,640,373
TRANSMISSION

Filed Nov. 15, 1949   4 Sheets-Sheet 1

INVENTOR.
Joseph Jandasek.
BY
Harness and Harris
ATTORNEYS.

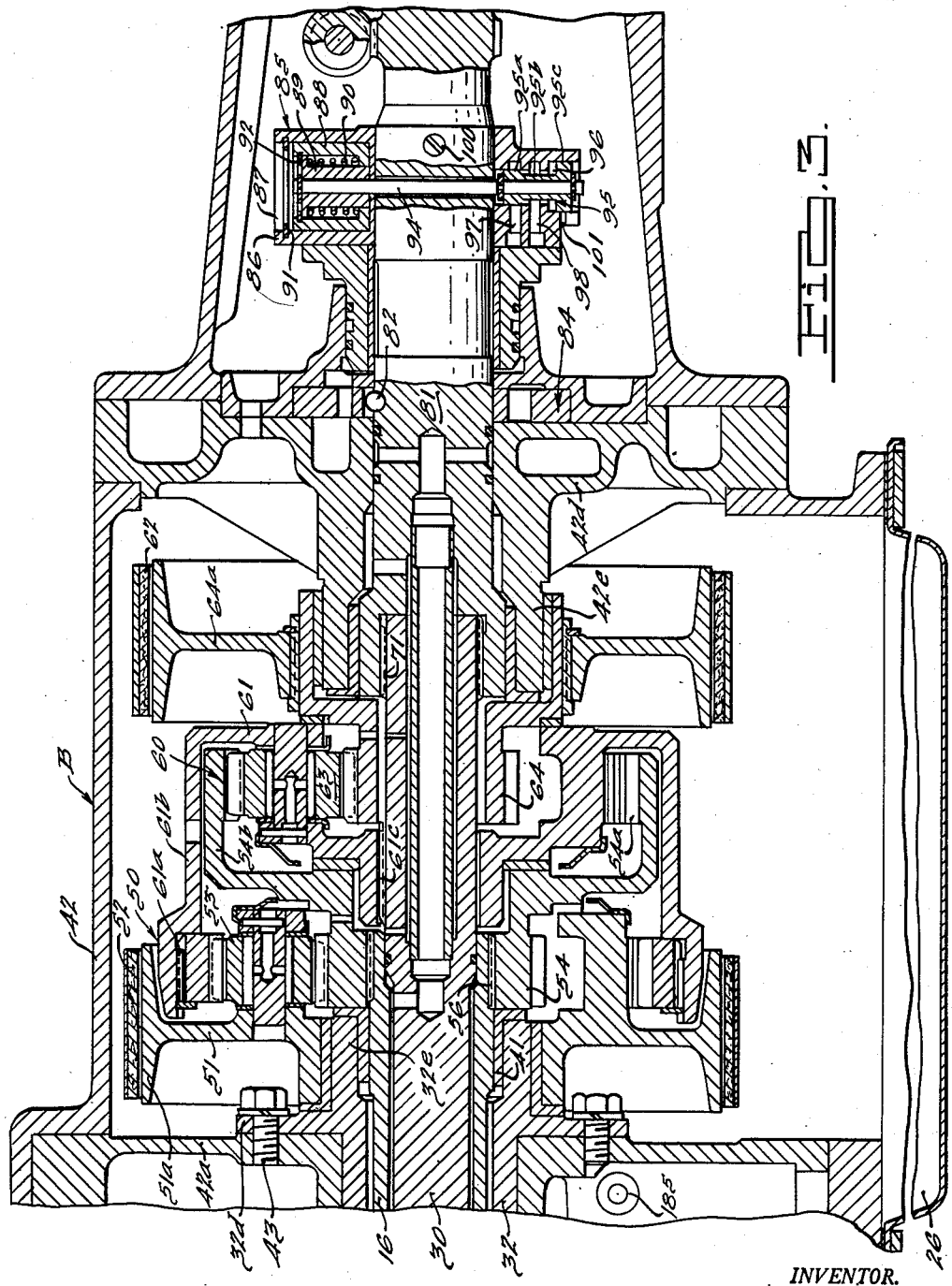

June 2, 1953 J. JANDASEK 2,640,373
TRANSMISSION
Filed Nov. 15, 1949 4 Sheets-Sheet 3
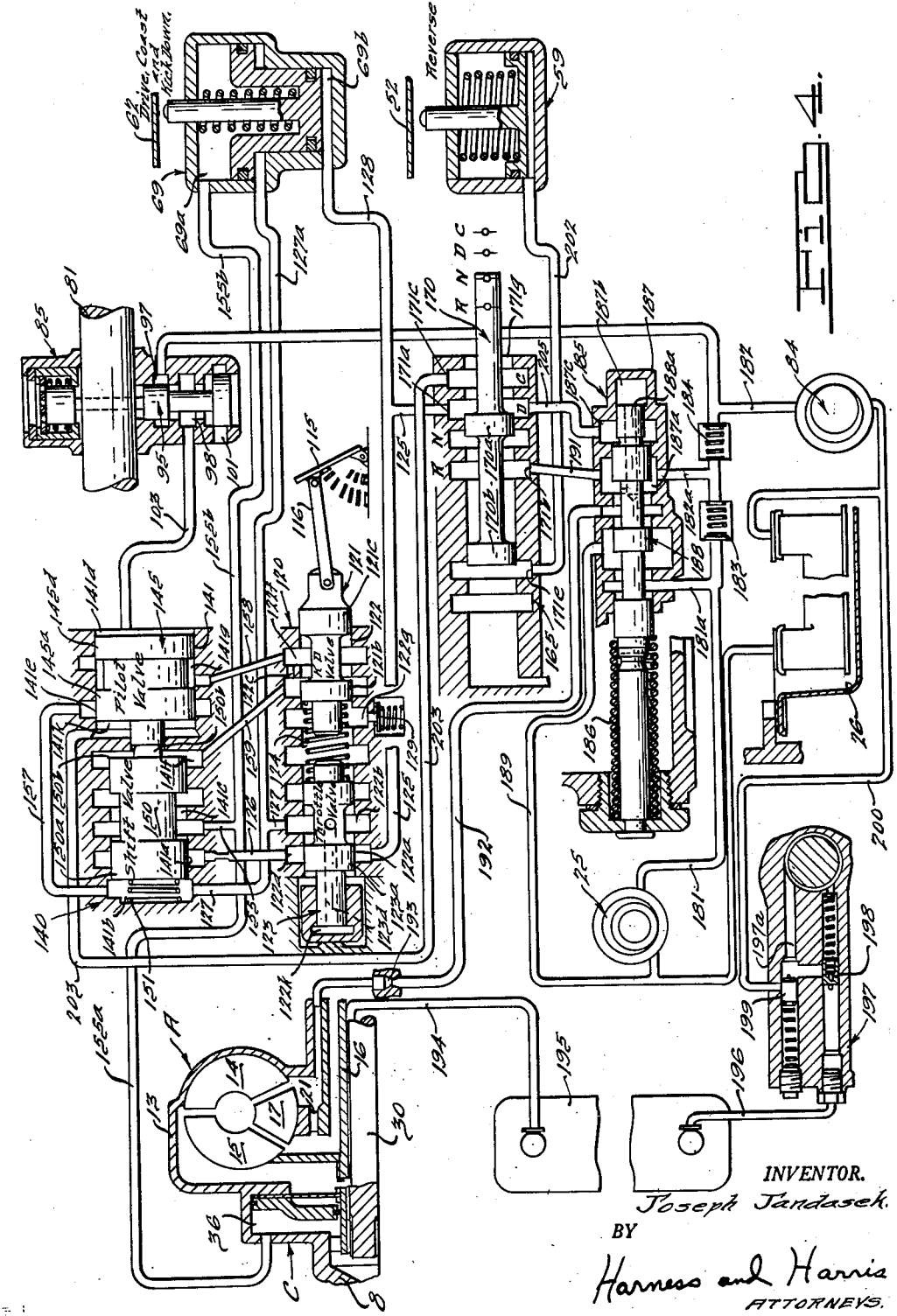
INVENTOR.
Joseph Jandasek.
BY
Harness and Harris
ATTORNEYS.

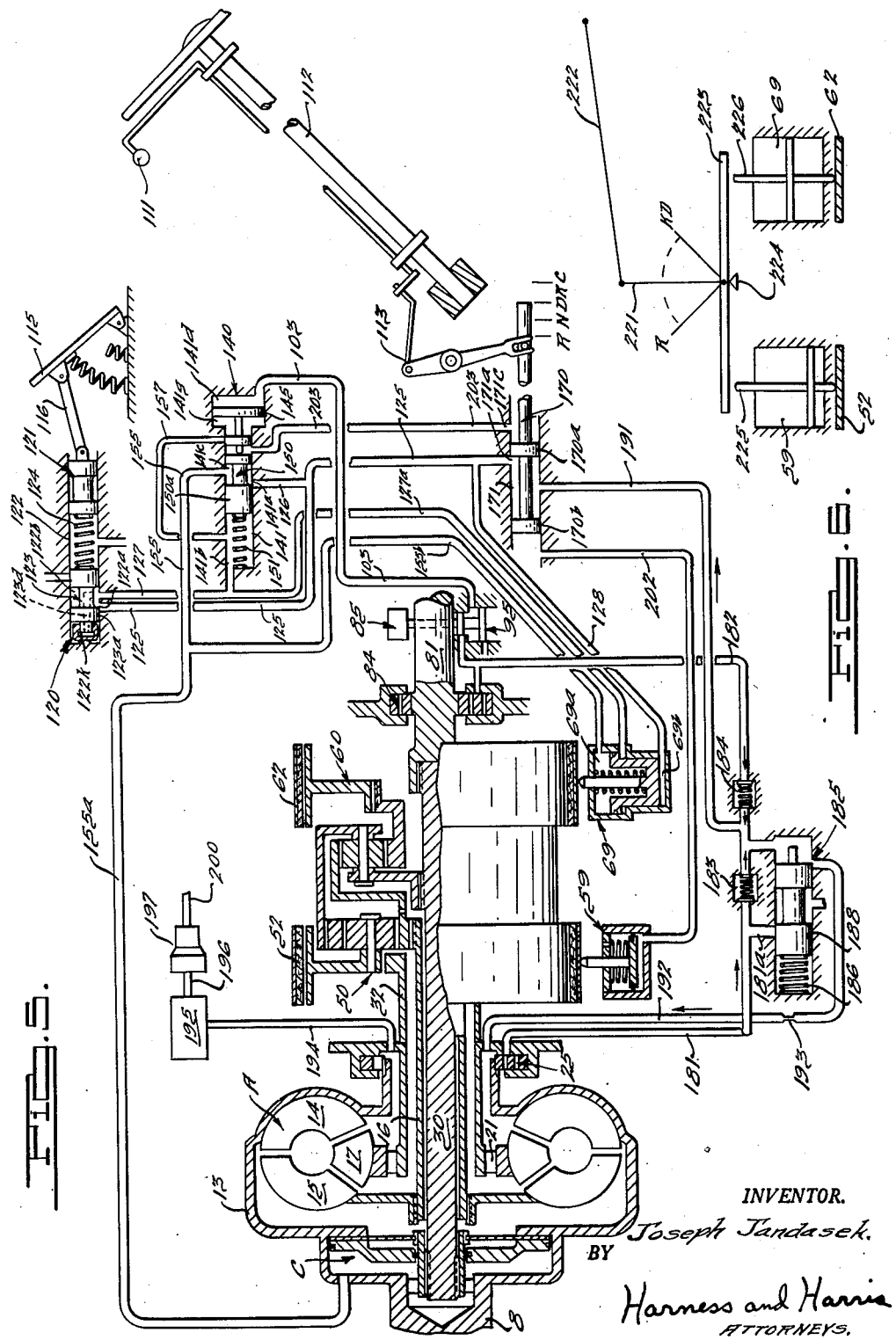

Patented June 2, 1953

2,640,373

UNITED STATES PATENT OFFICE 2,640,373

TRANSMISSION

Joseph Jandasek, Highland Park, Mich., assignor to Chrysler Corporation, Highland Park, Mich., a corporation of Delaware Application November 15, 1949, Serial No. 127,455

15 Claims. (Cl. 74—645)

This invention relates to power transmission units of the type including a hydraulic torque converter in combination with a plurality of drive transmitting gear trains.

It is a primary object of this invention to provide a simplified form of highly flexible power transmission unit which unit includes a combination hydraulically and mechanically transmitted, torque multiplying, accelerating underdrive train and means for automatically converting the accelerating underdrive train into a positively connected, two-way, forward, direct drive.

It is a further object of this invention to provide in a power transmission unit of the aforedescribed type means whereby the forward direct drive may be automatically downshifted to the accelerating underdrive ratio as the speed and torque load applied to the transmission output shaft varies and to further include means whereby the direct drive may be manually downshifted to the accelerating underdrive at the will of the operator irrespective of the automatic downshift controls.

It is another object of this invention to provide in a transmission unit of the aforedescribed type means whereby the positive direct drive may be manually downshifted to the accelerating underdrive ratio so that the underdrive ratio may be used as a coasting brake as well as an accelerating gear train.

It is a further object of this invention to provide a transmission unit of the aforedescribed type with manually operable means whereby turbo-braking may be obtained in the hydraulic converter unit to assist the engine braking obtainable when the transmission unit is conditioned for transmitting direct drive.

Other objects and advantages of this invention will become readily apparent from a reading of the attached specification and a consideration of the related drawings wherein:

Fig. 3 is a sectional elevational view of the gear box used in this transmission unit;

Fig. 4 is a diagrammatic view, partly in sectional elevation, of the torque converter unit, portions of the gear box and the hydraulically operated control system for the transmission unit;

Fig. 5 is another diagrammatic view of the transmission unit and the controls therefor including the manually operated drive selector mechanism; and Fig. 6 is a diagrammatic view of the manually operable means for obtaining turbo-braking with this transmission unit.

Figures 1, 2:
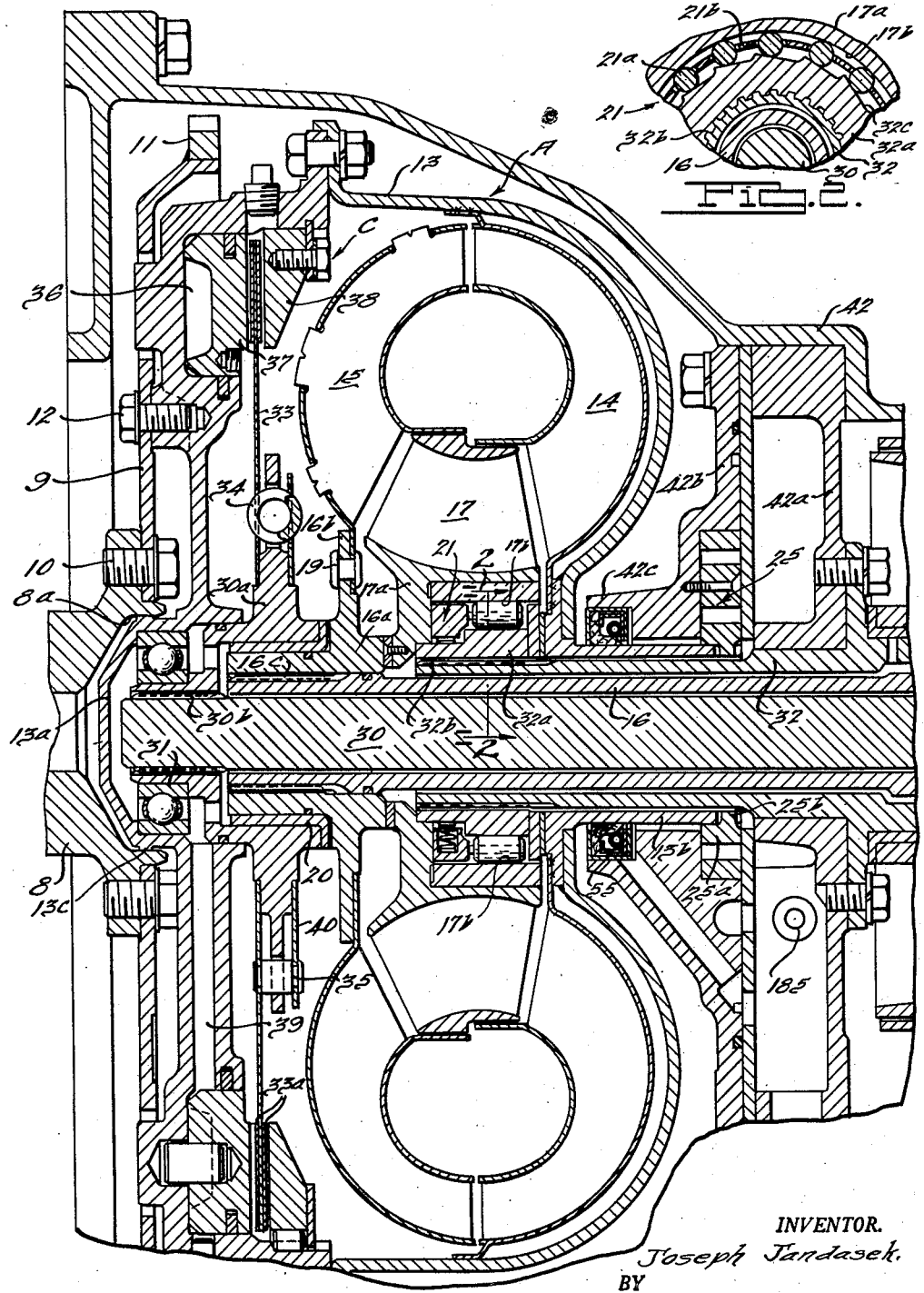
Fig. 1 is a partial sectional view of the hydraulic torque converter unit used in this transmission.
Fig. 2 is a sectional elevational view taken along the line 2—2 of Fig. 1 showing the one-way brake associated with the converter reaction member.

The invention disclosed herein is a modification of and an improvement on the power transmitting units disclosed in the copending applications of Frederic W. Slack, Serial No. 84,435, filed March 30, 1949, William L. Sheppard, Serial No. 98,493, filed June 11, 1949, and Joseph Jandasek, Serial No. 11,712, filed February 27, 1948, now U. S. Patent No. 2,616,310.

Figure 1 of the drawings disclose the hydrokinetic torque converter unit A that is operatively associated with the planetary gear unit B shown in Fig. 3. Converter unit A is adapted to drivingly connect a prime mover such as a motor vehicle engine to the input of the gear type torque transmitting and torque multiplying unit B which is arranged in series with the converter unit A. The reference numeral 8 represents an end portion of a driving member, such as the engine crankshaft of a motor vehicle power unit. The shaft 8 is drivingly connected to the axially flexible drive transmitting plate 9 by the screw means 10. The drive transmitting plate 9 has an engine starter ring gear 11 fixedly mounted about its periphery. Also drivingly connected to the drive plate 9 by the bolt means 12 is the torque converter casing 13 within which are mounted the various converter components, namely, the impeller member 14, the turbine or runner member 15, and the guide wheel or reaction member 17.

The vaned impeller wheel 14 is fixedly connected to the converter casing 13 by welds or the like and is accordingly adapted to be rotatably driven by the driving shaft 8. The vaned turbine wheel 15 is drivingly connected by rivet means 19 to a radially extending flange portion 16b formed on the hub member 16a that is connected by splines 16c to the forward end portion of the intermediate hollow shaft member 16.

The intermediate shaft member 16 is adapted to transmit drive from the turbine member 15 of the torque converter unit A to the planetary gear unit B which is arranged in series with the torque converter unit A. The forward end of intermediate shaft 16 is journaled by its hub 16a in the axially extending sleeve bearing 20 that is associated with the torque converter lock-up clutch C. The rear end portion of intermediate shaft 16 is rotatably supported by a sleeve-type of bearing 41 that is mounted in the fixed sleeve 32 carried by the housing 42 of the transmission unit B.

The vaned guide wheel 17 is rotatably supported within the converter casing 13 by means of the guide wheel hub portion 17a, that is rotatably mounted, by means of a one-way brake device 21, on the axially extending housing sleeve 32. Sleeve 32 is fixed to and projects from the wall 42a of the relatively stationary, gear box bearing 42. Sleeve 32 has a hub member 32a splined thereto at 32b which hub member supports the overrunning or one-way brake device 21. As clearly shown in Fig. 2, the one-way brake device 21 comprises rollers 21a mounted within a cage member 21b. The cage member 21b is normally urged into drive transmitting position by spring means not shown. Cam surfaces 32c, formed on the outer peripheral surface of the sleeve hub member 32a, cooperate with the clutch rollers 21a and the outer roller race 17b formed by the inner surface of the bore through the guide wheel hub member 17a. It is thought to be obvious from Fig. 2 that the one-way brake 21 will permit only forward rotary movement (clockwise when looking in the direction of arrows 2—2 of Fig. 1) to be transmitted to guide wheel 17 by the forward rotation of the impeller 14, the brake 21 preventing rotation of the guide wheel 17 in a reverse or counterclockwise direction.

The torque converter unit A includes a gear type oil pump 25 having a driving gear 25a that is directly connected by finger means 25b to the axially extending flange portion 13b of the rotatable converter casing 13. The pump 25 draws oil from a sump 26 (see Fig. 3) and circulates it through the converter unit A, the transmission lubricating system and the various hydraulically operated control mechanisms associated with this transmission unit (see Fig. 4). The circulation of oil through the converter A, by the pump 25, provides a means for maintaining the converter full of oil whenever shaft 8 is rotating. Furthermore, this circulation of the working fluid through the converter and the lubricating and hydraulically operated control systems provides a means for cooling the converter fluid. A second pump 84, driven by the transmission output shaft 81 is also included in this transmission to provide a source of pressure fluid when the engine is not operating. This pump will be more fully described in connection with the planetary gear box B.

The relatively stationary outer housing 42 for the transmission unit has a wall portion 42b from which there projects a forwardly directed, axially extending, sleeve-like, flange portion 42a. Flange portion 42c provides a cover for the pump unit 25 and also supports a fluid seal 55 that encircles the axially extending flange 13b of the converter casing 13.

The forward portion of converter casing 13 includes the axially extending, cup-like casing seat 13a for the bearing assembly 31 in which is rotatably mounted for forward portion of the solid drive transmitting shaft 30. Provision is made for permitting the casing seat portion 13a to expand and contract axially so as to absorb the inherent breathing tendencies of the somewhat flexible converter casing 13. Casing seat 13a is piloted within an axially extending bore 8a in the driving shaft member 8. A bearing means, such as the radially extending annular rib 13c, is provided on the converter casing seat 13a and extends between the seat 13a and the inner wall of the bore 8a in driving shaft 8. This rib-like bearing formation 13c provides a sliding telescopic connection between the casing 13 and driving member 8 to accommodate the breathing tendencies of the converter casing 13. The bearing rib 13c not only provides a sliding connection between the converter casing 13 and the driving member 8 but in addition it acts as a centering means to prevent twisting or cocking of the converter unit A about its axis of rotation. This axially shiftable mounting means for the torque converter casing 13 is completely described in the co-pending application of Augustin J. Syrovy, Serial No. 77,939, filed February 23, 1949, now U. S. Patent No. 2,588,668, and forms no part of this invention.

In order to provide means for transmitting a positive, two-way direct drive from the driving shaft 8 to the intermediate solid shaft 30 a torque converter lock-up clutch C is provided. The lock-up clutch C includes the radially extending drive transmitting disc 33 which has friction elements 33a mounted on its side faces adjacent its periphery. Drive transmitting disc 33 is drivingly connected to the solid shaft 30 through the shaft hub member 30a that is splined to the end of shaft 30 as indicated at 30b. Mounted between the disc 33 and the shaft hub member 30a are several circumferentially spaced compression spring elements 34 (only one shown) that cushion the torque impact transmitted to the disc 33 on engagement of the clutch C. Springs 34 thereby facilitate smooth engagement of the clutch C. Pins 35 are arranged to extend between the disc 33 and an anchor plate 40 through enlarged openings in the hub member 30a so as to provide an additional means to connect the disc 33 and hub member 30a in the event of failure of the springs 34. Pins 35 also urge the disc 33 and anchor plate 40 against the sides of the hub member 30a and thereby tend to damp out vibrations of the disc 33. Cooperatively associated with the drive transmitting disc 33 is a pressure fluid receiving cylinder 36 that is formed as a part of the torque converter casing 13. Mounted within the cylinder 36 is an axially shiftable, hydraulically actuated, piston 37. Cylinder 36 also supports a backing plate 38 which is arranged to cooperate with the piston 37 so as to provide a means to clampingly engage the friction faces 33a of disc 33 when pressure fluid is admitted to the cylinder 36. Pressure fluid may be introduced to the cylinder 36 through the bore 39 in the converter casing 13. Admission of pressure fluid to the cylinder 36 will move the piston 37 rearwardly so as to engage the torque converter lock-up clutch C and directly connect the driving shaft 8 to the intermediate solid shaft 30. On release of the pressure fluid from cylinder 36 suitable spring means (not shown) and the force of the pressure fluid within converter casing 13 will urge the piston 37 forwardly to disengage the clutch C and provide a means for the transmission of a troque multiplying drive from shaft 8 through the fluid operated torque converter A and the associated hollow intermediate shaft 16.

The gear box B includes the planetary gear trains 50, 60, which provide means for the transmission of torque multiplying reverse and forward drives respectively. The gear box housing 42 includes the forward wall portion 42a to which is connected by bolt means 43 a radially extending flange 32d of the axially extending hollow sleeve member 32. The rear portion 32e of sleeve 32 provides a journal support for the planet pinion carrier member 51 of the reverse drive planetary gear train 50.

Reverse drive planetary gear train 50 includes the planet pinion carrier 51 which is formed with an axially extending peripheral drum portion 51a adapted to be engaged by the braking band 52. Rotatably mounted on carrier 51 are a plurality of planet pinions 53, only one of which is shown in Fig. 3. The teeth of planet pinions 53 drivingly mesh with the external teeth of the sun gear member 54. Sun gear member 54 is drivingly connected to the rear end portion of the torque converter turbine driven hollow shaft 16 by means of the splined connection 56. The teeth of planet pinions 53 are also in meshing engagement with the internal teeth 61a formed on the drum-like extension 61b of the planet carrier 61 of the forward drive planetary gear train 60. The drum member 61b, while forming the annulus gear of the reverse drive planetary gear train 50, is supported by and also forms a part of the planet carrier 61 of the forward drive planetary gear train 60.

Forward drive planetary gear train 60 includes the planet pinion carrier 61 which is splined to and supported by the intermediate solid shaft 30 as indicated at 61c. Planet pinions 63 which are rotatably mounted on planet carrier 61, have teeth meshingly engaged with internal teeth 54a on the rearwardly projecting drum-like flange portion 54b of sun gear 54 of the reverse drive planetary gear train 50. This internally toothed portion 54a of the reverse drive planetary sun gear 54 thus forms the annulus gear of the forward drive planetary gear train 60. The teeth of pinions 63 also meshingly engage external teeth on the sun gear 64 which is journaled on the axially extending sleeve 42e carried by the gear box housing wall 42d. Sun gear 64 mounts a brake drum portion 64a. Braking band 62 is adapted to be applied to the peripheral portion of brake drum 64a to anchor the sun gear of the forward drive planetary gear train 60 against rotation.

It will be noted that the input to either of the planetary gear trains 50 or 60 is always through the driven sun gear member 54 which gear member is drivingly connected to the torque converter turbine driven shaft 16. The output from either of the planetary gear trains 50 or 60 is always through the planet pinion carrier 61 to the solid intermediate shaft 30. Intermediate shaft 30 is drivingly connected to the transmission output shaft 81 by the splined connection 71, therefore all drive through shaft 30 is directly transmitted to the output shaft 81. Drive from sun gear 54 through the several planetary gear trains to the output shaft 81 is controlled by the application of the several braking bands 52, 62 of the planetary gear trains 50, 60 and the condition of the torque converter lock-up clutch C. During the operation of this transmission unit at no time is there more than one braking band applied. The control system for operation of the braking bands and the lock-up clutch is so arranged that when any one band is applied the other band and clutch are released and as one band is released the other band or clutch is applied, consequently the transition from one drive transmitting train to another is smooth and unnoticed by the operator. When the clutch C is engaged both braking bands are released except when turbo braking may be used.

Whenever forward drive is to be initiated the clutch C is disengaged and braking band 62 is applied to the drum portion 64a of the sun gear 64 of forward drive planetary gear train 60. As the driving engine is speeded up to drive input shaft 8 at an increased speed, a combination fluid and mechanically transmitted, torque multiplying, underdrive is provided. This accelerating underdrive is from input shaft 8 through the torque converter A and the turbine driven intermediate hollow shaft 16 to the annulus gear portion 54a of gear member 54. As band 62 is applied the driven annulus gear 54a drives the pinion carrier 61 of gear train 60 forwardly at a torque multiplying ratio. The pinion carrier 61 is directly connected to the intermediate solid shaft 30 through the splines 61c and shaft 30 is directly connected to output shaft 81 through the splines 71 thus a torque multiplying underdrive from converter A through forward drive train 60 is transmittable to the output shaft 81. Acceleration through the combination fluid and mechanical, torque multiplying drive train continues until certain output shaft speed and torque conditions are achieved and then the transmission control system, subsequently described in detail, causes the band 62 to be disengaged and the torque converter clutch C to be applied to convert the torque multiplying underdrive into a positively connected, two-way direct drive. Release of band 62 and engagement of clutch C provides for the transmission of a direct drive from input shaft 8 through clutch C to the solid intermediate shaft 30 which latter shaft is directly connected to the output shaft 81. This direct drive is very efficient for cruising purposes for it by-passes the torque converter A and eliminates the slip thereof and it also provides a direct connection between the engine input shaft 8 and the output shaft 81, so that engine braking may be obtained. Downshifts from the cruising direct drive to the torque multiplying, accelerating, underdrive may be obtained both automatically and manually as will be subsequently explained in detail.

Reverse drive may be obtained by applying brake band 52 to the drum portion 51a of carrier member 51 of the reverse planetary gear train 50, the clutch C being disengaged at this time. Drive from input shaft 8 is then transmitted through the torque converter A to turbine driven intermediate hollow shaft 16. Shaft 16 drives the sun gear 54 of the reverse planetary train 50 forwardly while carrier 51 is being held by brake band 52 therefore a combination fluid and mechanically transmitted torque multiplying reverse drive is transmitted to the annulus gear portion 61a of planet pinion carrier 61. Carrier 61 is directly connected to the output shaft 81 through the intermediate solid shaft 30 thus a reverse drive from annulus gear 61a is transmittable from the input shaft 8 through the converter A and gear train 50 to the output shaft 81.

The control system for operation of the several brake bands 52, 62 and the torque converter lock-up clutch C is shown in Figs. 3, 4 and 5. Drivingly connected to the output shaft 81 (see Fig. 3 particularly) by the pin 82 is a second gear type oil pump 84. Oil pump 84 is arranged to draw fluid from the oil sump 26 and to circulate this fluid through the torque converter A and the hydraulically operated control and lubrication systems of the transmission unit whenever the output shaft 81 is rotating above a certain speed. Consequently, pump 84 provides pressure fluid for operation of the transmission unit during a pushed or towed start even if engine driven pump 25 is inoperative due to a dead engine or the like. Suitable controls such as the arrangement shown in Figs. 4 and 5 and subsequently described in detail, are provided to insure that pump 84 automatically takes over the supply of pressure fluid for the transmission unit whenever the speed of output shaft 81 exceeds a certain predetermined value. This relieves the transmission driving engine of the load of front pump 25 after the engine unit has begun to drive the transmission output shaft 81.

Also drivingly mounted on the output shaft 81 (see Figs. 3, 4 and 5) is a speed responsive, centrifugal force operated governor mechanism 85 which provides one of the means for automatically controlling operation of this transmission unit. It is obvious that various types of speed and torque responsive controls may be used with this transmission but the specific governor mechanism 85 herein disclosed is particularly advantageous due to its simplified design and novel manner of operation. This governor unit is arranged such that it does not require shaft driven gearing or electrically operated control units but instead uses hydraulic pressure supplied by the rear pump 84 in combination with the centrifugal force effect of a pair of output shaft mounted weights 88, 89 for controlling actuation of the radially movable governor control valve 95 so as to provide a novel type of governor mechanism.

The governor 85 comprises the body portion 86 having a cylindrical bore 87 extending inwardly from one end thereof. Reciprocably mounted in the bore 87 are the cylindrical primary and secondary weights 88 and 89 respectively, which weights are telescopically arranged for movement relative to each other. Extending between the spaced apart flanges on the weights 88 and 89 is a preloaded compression spring 90 that tends to urge the weights 88 and 89 apart. A snap ring 91 mounted in the bore 87 of valve body 86 provides a seat for the primary weight 88 when it is moved outwardly a predetermined distance by centrifugal force due to the rotation of driven output shaft 81. Mounted in the bore in primary weight 88 is a snap ring 92 that provides a seat for the secondary weight 89 on the primary weight 88. Extending through aligned bores in the secondary weight 89 and the driven output shaft 81 is a tie shaft 94 that has one end suitably anchored to the secondary weight 89 by means of a snap ring or the like. The other end of tie shaft 94 has mounted thereon the piston type governor control valve 95. The governor valve 95 is arranged to reciprocate in the T-shaped bore 96 in the valve body 86. Governor piston valve 95 has spaced lands 95a and 95c of different diameters connected by a narrow neck portion 95b. Extending through the valve body 86 transversely to bore 96 and intersecting bore 96 are the pressure fluid inlet and outlet passages 97 and 98 respectively. Passage 97 is arranged to be connected by conduit means (see Figs. 4 and 5) to the outlet from rear oil pump 84. The pressure fluid from pump 84 is thus applied through inlet passage 97 to the stem portion of valve bore 96. The outlet passage 98 from the stem portion of the piston bore 96 is connected to an outlet conduit 103. The conduit 103 conducts the pressure fluid discharged from the piston valve bore 96 to the cylinder 141d (see Figs. 4 and 5) in which is mounted the pilot valve 145 of the automatic control valve unit 140. Control valve unit 140 is subsequently described in detail. Valve body 86 also includes a relief port 101 to relieve the excess pressure of the fluid in bore 96 of the governor unit 85. Relief port 101 also acts as a means to balance the valve 95 in the bore 96 when it is acted on by the weights 88, 89 and the pressure fluid in bore 96. The valve body 86 is fixedly connected to the driven output shaft 81 by the set screw 100. The governor tie shaft 94 is of such size as to be freely slidable in its shaft receiving bore through output shaft 81 and is not required to serve as a means for fastening the governor body 86 to the output shaft 81.

The governor 85, which functions as a fluid pressure reducing valve, receives fluid under pressure from the rear pump 84 as soon as output shaft 81 begins to rotate. This pressure fluid from pump 84 is admitted to the valve bore 96 through the inlet passage 97 and a hydraulic pressure is applied to the opposed inner surfaces of valve lands 95a and 95c. As land 95c is larger in diameter than land 95a there is an unbalanced area which causes an unbalanced force to be applied to piston valve 95 which force tends to move valve 95 radially outward so as to cause valve land 95a to close off the pressure fluid inlet passage 97. Due to the rotation of output shaft 81 there is also a simultaneously acting centrifugal force tending to urge the primary and secondary weights 88, 89 radially outward. As tie shaft 94 connects weights 88 and 89 to piston valve 95 it is obvious that the centrifugal force of the weights 88 and 89 and their connecting spring 90 is opposed by the hydraulic pressure applied to the unbalanced area of the piston valve land 95c. Consequently the centrifugal force of the elements 88, 89, 90 tends to move valve 95 so as to uncover the passage 97 and connect the pressure fluid inlet passage 97 to the valve bore 96 and outlet passage 98 while the unbalanced hydraulic force applied to piston valve land 95c tends to shift valve 95 in the opposite radial direction so as to close off the connection between inlet passage 97 and the valve bore 96 and outlet 98.

The pressure fluid that is admitted to valve bore 96 is conducted through the outlet passage 98 to other parts of the control system to actuate the various control devices that will be subsequently described in detail.

If the pressure of the fluid admitted to the bore 96 from inlet 97 becomes excessive and exceeds the centrifugal force of the elements 88, 89, 90 then valve 95 will move radially outward a sufficient amount to uncover the relief port 101 and the pressure fluid in the stem portion of bore 96 will spill out and reduce the pressure of the contained fluid to a value where a condition of equilibrium will again be set up between the centrifugal force of the elements 88, 89, 90 and the unbalanced force applied to the valve land 95c. A more complete description of the operation of this governor device 85 is set forth in the previously referred to co-pending application of William L. Sheppard, Serial No. 98,493.

While the pressure of the fluid discharged from the pump 84 into the governor inlet passage 97 is almost constant and also greater than the pressure of the fluid discharged from the governor valve bore 96 into the outlet passage 98, due to the reducing valve action of piston valve 95, still, it is thought to be obvious that the pressure of the fluid discharged from the governor 85 is roughly proportional to or responsive to the speed of the output shaft 81 and that governor 85 provides an efficient, simplified form of speed sensitive control mechanism.

Cooperating with the speed sensitive governor 85 to control operation of this transmission is a torque regulating or responsive control means 120. The torque regulating control means 120 (see Figs. 4 and 5) that is operably associated with this transmission comprises the kickdown valve 121 and the throttle valve 123. This control means 120 is operated by the conventional throttle control or accelerator pedal 115 for the engine unit (not shown) that drives the transmission unit. Pedal 115 is connected to the kickdown valve 121 by the linkage 116. Kickdown valve 121 is arranged to reciprocate in the valve cylinder body 122 and is connected to the reciprocably mounted throttle valve 123 by a preloaded compression spring 124. At the closed throttle position of the accelerator pedal 115 with the manually operated drive ratio control valve 170 set for "drive" (see Fig. 5) the arrangement is such as to pressurize conduits 125 and 128 with pump pressure fluid. Admission of pump pressure fluid to conduit 128 applies pressure fluid to the chamber 69b on the apply side of servo 69 and causes application of brake band 62 to drum member 64a to condition the transmission for the accelerating, torque multiplying underdrive. Clutch C is disengaged at this time for the positions of throttle valve 123 and shift valve 150 at closed throttle are such as to prevent pressure fluid from conduit 125 from entering conduits 155 and 155a to effect engagement of clutch C. At closed throttle the land 123a of throttle valve 123 is positioned so as to substantially close cylinder port 122a and prevent the pump pressure fluid or so-called line pressure fluid (approximately 90 p. s. i.) in supply conduit 125 from being transmitted to chamber 122b of the valve cylinder 122. At closed throttle there is sufficient preload on spring 124 to shift valve 123 to the left a sufficient amount to permit seepage of a certain amount of pressure fluid from conduit 125 around valve land 123a into chamber 122b to develop about 20 p. s. i. pressure in chamber 122b and in conduit 127 at closed throttle. Land 123a does not however prevent the line pressure fluid in conduit 125 from passing through the cylinder by-pass groove 122d and entering the conduit 126 that communicates with the line pressure inlet port 141a in one end of the cylinder body 141 of the automatic control valve mechanism 140. As the accelerator pedal 115 is depressed from its closed throttle position to initiate vehicle acceleration the kickdown valve 121 is moved to the left and this movement is transmitted by spring 124 to throttle valve 123 which latter valve is moved to the left a sufficient amount to uncover the line pressure inlet port 122a in cylinder body 122 and admit line pressure fluid from conduit 125 to the chamber 122b of the cylinder 122. The line pressure admitted to chamber 122b from inlet port 122a at partial depression of the accelerator pedal 115 is of a lower pressure than the line pressure in conduit 125 due to the reducing valve action of the throttle valve 123. The pressure of the fluid admitted to the chamber 122b by the reducing valve action of throttle valve 123 is hereafter referred to as throttle controlled pressure and the pressure of this pressure fluid varies with degree of throttle opening. At wide open throttle with pedal 115 substantially depressed there is substantially a direct connection between conduit 125 and chamber 122b. Consequently, the throttle controlled pressure in chamber 122b will equal the line pressure in conduit 125. The admission of throttle controlled pressure fluid to chamber 122b of cylinder 122 has a tendency to shift the throttle valve 123 to the right to oppose depression of the accelerator pedal for it will be noted than an axially extending bore 123d through the throttle valve 123 applies the throttle controlled pressure fluid in chamber 122b to the bore 122k at the left end of valve 123 which throttle controlled pressure reacts against the left end of throttle valve 123 and tends to balance the force of the pressure being applied to the right end of valve 123 by the accelerator pedal actuated kickdown valve 121 through the compressed spring 124. The bore structure 123d thus cooperates with the cylinder 122k at the left end of throttle valve 123 and provides a pressure fluid regulator control for governing the pressure and the volume of the throttle controlled pressure fluid introduced into the chamber 122b, the conduit 127, and the associated chamber 141b of automatic control valve 140.

The throttle controlled pressure admitted to valve chamber 141b of automatic control valve unit 140 during initial depression of the accelerator pedal 115, when valve 170 is set for "drive," applies a variable pressure to the left end of land 150a of shift valve 150 (see Fig. 5) which pressure assists the spring 151 in urging shift valve 150 towards the right end of valve cylinder 141 which is the downshifted position of the valve 150. Thus during initial depression of accelerator pedal 115 the valve land 150a of shift valve 150 is positioned so that it covers line pressure inlet port 141a to the valve cylinder 141 and prevents line pressure from supply conduit 126 from passing into the chamber 141c of valve cylinder 141. The chamber 141c is connected by conduits 155 and 155a with the control cylinder 36 of the torque converter lock-up clutch C and by conduits 155 and 155b with the release side 69a of the servo 69 of the forward drive planetary gear train 60. Thus it will be seen that the position of shift valve 150 control engagement and disengagement of the direct drive or converter lock-up clutch C as well as disengagement of the braking band 62 of the forward drive planetary gearing 60. It is therefor thought to be obvious that the position of shift valve land 150a controls the automatic upshifts and downshifts between the accelerating underdrive ratio transmitted through the series arranged torque converter A and the forward drive planetary gearing 60 and the cruising direct drive ratio transmitted through engaged clutch C and the solid shaft 30.

As the accelerator pedal 115 is further depressed during initiation of normal forward starting drive through the series arranged torque converter A and forward drive gear train 60, the speed of driven tailshaft 81 is increased and consequently the governor pressure, that is the pressure of the output shaft speed responsive fluid directed from the governor outlet 98 through conduit 103 to the chamber 141d of the automatic control valve unit 140, is gradually increased. The governor pressure directed into chamber 141d of valve unit 140 (see Fig. 4) is applied to the right end or head 145d of the pilot valve 145 which valve is reciprocably mounted in the valve cylinder 141. This variable governor pressure applied to the pilot valve 145 tends to shift the pilot valve towards the left. Movement of pilot valve 145 to the left is opposed by the variable throttle controlled pressure fluid in chamber 141b at the opposite end of valve cylinder 141 which latter pressure is urging the shift valve 150 towards the right. The shift valve 150 is directly engaged to the pilot valve 145 through the stem portion 150b.

As the speed of output shaft 81 increases the governor pressure applied to the chamber 141d and to the right end or head 145d of pilot valve 145 increases in intensity and creates a force that gradually overcomes the force of the throttle controlled pressure in valve chamber 141b at the left end of cylinder 141. When the force resulting from the governor pressure in chamber 141d exceeds the force exerted by the throttle controlled pressure in chamber 141b and that of the spring 151 then the pilot valve 145 shifts towards the left and moves the shift valve 150 to the left at the same time. As soon as the land 145a of pilot valve 145 has been moved sufficiently to the left to uncover the throttle controlled pressure inlet port 141e in cylinder 141 then throttle controlled pressure from conduit 157 is admitted to the bore portion 141g of the cylinder 141. Admission of throttle controlled pressure fluid to the bore portion 141g of valve cylinder 141 fills connected conduits 158 and 159 and lag pressure chamber 141f of cylinder 141 with throttle controlled pressure fluid. Admission of throttle controlled pressure fluid to the lag pressure chamber 141f of valve body 141 applies a leftwardly directed force to the lag area 150b at the right end of the shift valve 150. This leftwardly directed, throttle controlled pressure generated force applied to the shift valve 150 combines with the governor pressure force applied to the head 145d of pilot valve 145 to overcome the rightwardly directed throttle controlled pressure generated force that is being applied to the left end of land 150a of the shift valve 150. As a result of the sudden rearrangement of the several forces applied to the shift valve 150, due to the admission of throttle controlled pressure to the lag pressure chamber 141f, the shift valve 150 is suddenly shifted or snapped towards the left and the line pressure inlet port 141a is connected to the chamber 141c of valve body 141 so that line pressure from conduit 126 is now admitted to the conduit 155 and directed by branch conduit 155a (see Figs. 4 and 5) into the cylinder 36 of lock-up clutch C to cause engagement of the clutch C. At the same time line pressure from conduit 155 will be directed by branch conduit 155b into chamber 69a on the release side of servo 69 to effect disengagement of the brake band 62. The transmission unit has thus been automatically upshifted from the condition whereby it transmits the torque multiplying, accelerating underdrive ratio to the condition whereby it transmits a direct drive as a result of the coordinated action of the hydraulic governor 85, the torque regulating control unit 120, and the automatic change speed control valve unit 140.

While most upshifts and downshifts of the shift valve 150 will occur automatically and be controlled by the pressure differential relationship between the variable throttle controlled pressure and the variable governor pressure, still, there are times when it is advantageous to have a manually controlled means to overrule the automatic control valve unit 140 in order to effect a kickdown or downshift from direct drive to the accelerating underdrive ratio when operating at a speed above that at which the automatic downshift would occur. Such a manually controlled kickdown means is included in this control system. To effect such a kickdown it is merely necessary to depress the accelerator pedal 115 to its wide open throttle position and this will shift the valve land 121b (see Fig. 4) of kickdown valve 121 to the left a sufficient amount to connect conduit 159 with the chamber 122g of valve cylinder 121 and with kickdown pressure relief valve 129. Connection of conduit 159 with valve 129 reduces the pressure in the lag pressure chamber 141f of valve cylinder 141 to the pressure setting of relief valve 129 (12 p. s. i.). This venting of the throttle controlled pressure from the lag pressure chamber 141f through relief valve 129 reduces the forces holding the shift valve 150 in its upshifted position and conditions the automatic control valve unit 140 for a downshift provided the throttle controlled pressure in chamber 141b is sufficient to overrule the governor pressure in chamber 141d. When the kickdown valve 121 is depressed to its wide open throttle position to accomplish a kickdown it will be noted that the valve land 121c of valve 121 will block off the inlet port 122f from conduit 158. This closes the passageway connecting conduit 158 with conduit 159 through the valve cylinder 122. Valve land 121c thus prevents flow of throttle controlled pressure fluid from conduit 158 to conduit 159 through the aforementioned passageway in the valve cylinder 122. To insure a sufficient supply of throttle controlled pressure fluid to the conduit 159 and lag chamber 141f during kickdown so as to maintain a reduced pressure in conduit 159 of approximately the setting of kickdown relief valve 129 (12 p. s. i.) the conduits 158 and 159 are connected by a small bleed bore 122c. Bore 122c permits a small amount of throttle controlled pressure fluid in conduit 158 to bleed into the conduit 159 so as to pressurize conduit 159 and compensate for leakage and at the same time maintain sufficient throttle controlled pressure in the conduit 158 and the automatic control valve unit 140 to insure proper functioning of the valve unit 120. Loss of throttle controlled pressure in the valve unit 140 due to a venting of conduit 158 through relief valve 129 might prevent a downshift of shift valve 150 due to insufficient throttle controlled pressure in chamber 141b to overrule the governor pressure in chamber 141d.

With the throttle controlled pressure in chamber 141f reduced to 12 p. s. i. due to the kickdown valve 121 venting the lag chamber 141f through the relief valve 129, conditions are such that the throttle controlled pressure in chamber 141b may then overcome the force of the governor pressure in chamber 141d and the shift valve 150 will shift towards the right to complete the kickdown to the condition for transmitting the underdrive ratio. It is obvious that at a very high vehicle speed the governor pressure in chamber 141d may be so great that the throttle controlled pressure in chamber 141b can not overcome the effect of the governor pressure in chamber 141d and then a kickdown is impossible. The automatic control valve unit 140 thus provides an upper limit kickdown level which prevents kickdown at very high speeds. This prevents damage to the transmission and insures smooth transmission performance. It will be noted that the diameter of the pilot valve 145 is greater than the diameter of shift valve 150 therefore with substantially equal throttle controlled and governor controlled pressures, such as may exist at high vehicle speeds, a downshift will not be accomplished due to the greater force effect of the governor pressure in chamber 141d holding the shift valve 150 in upshifted position. For a more detailed explanation of the transmission control system see the aforementioned application of William L. Sheppard, Serial No. 98,493, filed June 11, 1949.

The control system shown in Figs. 4 and 5 also includes the conduits 181 and 182 which connect the pumps 25 and 84 respectively with a pressure regulator valve unit 185. Spring 186 of pressure regulator valve 185 determines the pressure that is to be maintained in the line pressure fluid supply conduit 191 that connects regulator valve 185 to the manual control valve unit 165. A pressure of approximately 90 p. s. i. in conduit 191 has been found to be satisfactory for operation of this transmission control system in the "drive" and "coast" ratios whereas a pressure of approximately 180 p. s. i. is used for "reverse." Pressure regulator valve 185 provides each of these pressures in a manner that is subsequently explained. The pump output conduits 181 and 182 each include check valves 183 and 184 respectively to insure a suitable pressure head in the control system at all times. With the control arrangement shown the pump 25 supplies the fluid pressure for starting drive under ordinary conditions and as the speed of output shaft 81 increases the pump 84 automatically takes over and feeds the manual control valve supply conduit 191. As pump 84 comes into operation the pressure fluid supplied therefrom is transmitted by conduit 182a to chamber 187a of pressure regulator valve body 187 and this pump pressure acts on piston valve 188 and moves valve 188 towards the left compressing spring 186. Movement of valve 188 to the left displaces this valve sufficiently so as to connect conduit 181 through branch conduit 181a to by-pass conduit 189 thereby providing a by-pass for the output of the front pump 25. Upon the operation of either pump 25 or 84 the fluid pressure in conduit 182a is transmitted to the chamber 187b of valve body 187 through bore 188a in valve 188. The pressure in chamber 187a is always sufficient to move valve 188 slightly to the left so as to connect conduit 182a with conduit 192 which supplies pressure fluid to the torque converter unit A. This arrangement maintains the converter unit A full of fluid during all operations thereof. Restriction 193 in conduit 192 controls the volume of the fluid supplied to the converter A. The fluid directed through the converter A is returned to the supply sump 26 through the conduit 194 that is connected to suitable pressure fluid cooling means 195. Conduit 196 leading from the cooling means 195 is connected to a valve unit 197 that includes the pressure relief valve 198 for controlling the pressure of the fluid supplied to the converter unit A. This converter pressure control valve 198 maintains a pressure of about 40 pounds per square inch in the converter unit A. Valve unit 197 (see Fig. 4) also includes a by-pass conduit 197a that connects the pressure fluid passed through valve 198 to a pressurized lubrication system that is controlled by the pressure control valve 199. Valve 199 maintains a pressure head in the lubrication system and dumps the excess pressure fluid supplied thereto into the supply sump 26. Conduit 200 connects the valve 99 of valve unit 197 to the supply sump 26.

The manual controls for this transmission unit (see Fig. 5) includes the drive selector lever 111 which is rotatably mounted on the conventional vehicle steering column 112. Control lever 111 is connected to the manually operated control valve 170 of valve unit 165 by the linkage arrangement 113. Drive selector lever 111 has four positions as clearly shown in Fig. 5. These positions include "reverse," "neutral," "drive" and "coast" or manually controlled kickdown. The four positions are denoted by the letters R, N, D and C respectively in the various figures of the drawings.

*Operation*

When drive selector lever 111 is in the "neutral" position (see Fig. 4) then land 170a of manual control valve 170 will be positioned across the inlet port 171a of valve body 171 so that supply conduit 191 can not direct pressure fluid into conduit 125 or any of the control conduits branching out from conduit 125. At the same time valve land 170b of control valve 170 will prevent pressure fluid from entering the conduit 202 that supplies pressure fluid to the reverse drive servo 59. Accordingly, none of the planetary brake bands 52, 62 nor the direct clutch C will be engaged and neither a forward nor reverse drive is transmittable to the output shaft 81. The front pump 25 at this time will merely circulate fluid through the converter A and the lubrication system while the rear pump 84 is inactive.

If the drive selector lever 111 is moved to the forward "drive" position (as shown in Fig. 5) valve land 170a of manual control valve 170 will be positioned to the right of outlet port 171a so that pressure fluid from supply conduit 191 passes through the manually operated control valve assembly 170 and into the control conduits 125, 126, and 128. It will be noted that the line pressure fluid in conduit 125 is conducted by branch conduit 128 to the apply or on side 69b of servo 69 so as to activate the planetary gearing 60 for transmission of the starting forward underdrive. As "reverse" drive supply conduit 202 and "coast" drive supply conduit 203 are both blocked off from the line pressure supply conduit 191 by the lands 170b and 170a respectively of control valve 170, when control valve 170 is positioned for "drive," obviously reverse planetary 50 will not be activated and the shift valve 150 will not be locked in its downshifted "coast" position so as to prevent the automatic upshift to direct drive when the speed and torque conditions for accomplishing such an upshift are attained.

Prior to depression of the accelerator pedal 115 from its closed throttle position, when drive selector lever 111 is positioned in "drive," the throttle valve 123 and the shift valve 150 will be so positioned in their respective valve cylinders that sufficient pressure fluid from conduits 125 and 126, will not be introduced into either of these control valve mechanisms nor into the conduit 155, 155a to cause engagement of direct drive or torque converter lock-up clutch C. Furthermore, the engine speed at closed throttle with the transmission set in the forward "drive" position will be such that slip in the torque converter unit A and drag of the associated drive train elements will prevent a forward drive being transmitted to the driven shaft 81 even though the planetary brake band 62 is applied to activate the forward drive planetary gear train 60.

Subsequently, as the accelerator pedal 115 is depressed to increase the speed of the driving engine unit (not shown) and to initiate forward movement of the vehicle, the throttle valve 123 will be moved towards the left in the manner previously described and sufficient throttle controlled pressure fluid from valve chamber 122b of the accelerator responsive valve unit 120 will be admitted to the control conduit 127, and to the chamber 141b of the automatic control valve unit 140 so as to condition the control system for the automatic upshift to direct drive. During initial depression of the accelerator pedal 115 the force of the throttle controlled pressure on the left end of land 150a of shift valve 150 is greater than the force of the governor pressure in chamber 141d that is transmitted to the right end of shift valve 150 by the pilot valve assembly. Accordingly, the shift valve 150 will be urged towards the right and positioned so that land 150a blocks off the line pressure inlet port 141a from the conduit 126 and consequently line pressure fluid cannot be introduced into conduits 155, 155a and 155b to effect engagement of the direct drive clutch C and disengagement of brake band 62 of the planetary gearing 60 which gearing is arranged for the transmission of the starting forward drive. Accordingly, during initial forward acceleration in the "drive" ratio the relatively high torque multiplication of the converter unit A is combined with the torque multiplication effect of the planetary gearing 60 to provide an efficient, highly effective torque multiplying underdrive. This drive is from drive shaft 8 through converter A to turbine driven intermediate driven shaft 16 and then through planetary gearing 60 to the output shaft 81.

On continued depression of the accelerator 115 and increase in the output shaft speed there occurs the previously described automatic upshift to direct drive. As the speed of output shaft 81 increases, and the torque load decreases, the speed responsive governor pressure in chamber 141d of the automatic control valve 140 will increase and overrule the throttle controlled pressure in chamber 141b of the control valve unit 140 whereupon shift valve 150 will be shifted towards the left to connect conduits 126, 155, 155a and 155b to effect engagement of the direct clutch C and disengagement of brake band 62. This shift of valve 150 to the left converts the accelerating relatively high torque multiplying underdrive into a positively connected, efficient direct drive for cruising purposes.

On upshift of valve 150 line pressure fluid is admitted to the conduit 155 from conduit 126 through valve unit 140. This line pressure fluid is conducted to the direct drive or lock-up clutch C and to the release side of servo 69. Admission of pressure fluid to clutch C locks up the torque converter and conditions the transmission for the transmission of the cruising direct drive. Pressure fluid admitted to conduit 155 is also transmitted by conduit 155b to the release or off side of servo 69 to effect disengagement of the planetary brake band 62 and thereby terminate the accelerating torque multiplying underdrive.

It is thought to be obvious that the automatic upshifts and downshifts will occur at varying speeds depending on the relationship existing between the governor controlled pressure and the throttle controlled pressure under varying conditions. At light or closed throttle when the torque requirement is relatively low the upshift will occur at about 18 miles per hour whereas at wide open throttle with a relatively high torque load the upshift may not occur until at about 60 miles per hour vehicle speed. The automatic downshifts will vary with the speed and torque relationships but, as previously pointed out, the downshift for a given speed and torque condition will be at a lower vehicle speed than the corresponding upshift due to the effect of the lag pressure in valve chamber 141f of the control valve 140. The automatic downshifts will preferably occur between 10 and 15 miles per hour vehicle speed and must be at a speed less than the closed throttle automatic upshift so as to prevent hunting of the shift valve.

If, while traveling in the cruising direct drive ratio, a high speed accelerating underdrive is desired, then a kickdown to a more favorable accelerating ratio may be manually effected by merely depressing the accelerator pedal 115 to its wide open throttle position and thereafter kickdown valve 121 will effect the kickdown or downshift in the manner previously described.

It will be noted that whenever the transmission is set for "drive" that the throttle controlled pressure in branch conduit 127a is conducted to the apply or on side of servo 69. Thus the force applying the band 62 is always directly proportional to the throttle controlled pressure. This is quite advantageous as it tends to smooth out the application of the band 62 and to also reduce slip of the band during the upshifts and downshifts.

In addition to the automatic downshift from direct drive to the accelerating underdrive, which downshift is primarily controlled by the speed responsive governor 85, and the manually effected kickdown from direct drive, which is accomplished by maximum depression of the foot accelerator 115, there is still a third way in which to effect a downshift from direct drive to the accelerating underdrive ratio with this transmission control system. This transmission control system includes a shift lever setting for obtaining a "coast" drive ratio wherein the accelerating underdrive ratio used for starting forward drive is used for coast braking. The "coast" drive setting provides a means for downshifting valve 150 and locking the valve 150 in its downshifted position so as to prevent an automatic upshift to direct drive even though the speed and torque conditions are proper for such an upshift. "Coast" drive is obtained by shifting the drive selector lever 111 into the position indicated for "coast." Such a shift positions valve land 170a adjacent the right edge of outlet port 171c and permits line pressure from conduit 191 to pass into conduit 203 which directs the line pressure fluid into chamber 141k of the automatic control valve cylinder 141. Line pressure in chamber 141k will prevent the governor pressure in chamber 141d from shifting the pilot valve assembly 145 to the left so as to upshift the shift valve 150 and convert the underdrive into a direct drive. It will be noted that when the manual control valve 170 has been shifted to the "coast" drive position so as to locate land 170a on valve 170 adjacent the right edge of the outlet 171c to conduit 203 that then line pressure fluid is also being admitted to the "drive" control conduit 125. As previously pointed out the admission of pressure fluid to conduit 125 will apply the forward drive brake band 62 and condition the transmission for the torque multiplying underdrive.

Reverse drive may be obtained by moving the drive selector lever 111 to the "reverse" control position. This positions the manually operated control valve 170 in such a position that the valve land 170a of valve 170 is adjacent the right edge of the line pressure inlet port 171b and the land 170b adjacent the left edge of the outlet port 171e so that pressure fluid from supply conduit 191 is directed into the outlet port 171e at the left end of valve body 171 and into the reverse servo control conduit 202. At this time all forward drive control conduits are blocked off from line pressure supply conduit 191 by valve land 170a. The forward drive control conduits 125 and 203 at this time are opened to the sump 26 through the drain 171g at the right end of valve body 171 so as to drain the pressure fluid from both the direct drive clutch D and the forward drive servo control unit 69. Admission of pressure fluid to the "reverse" control conduit 202 actuates the "reverse" band servo 59 and applies reverse braking band 52 so that the planetary gearing 50 will transmit a reverse drive from input shaft 8 and turbine driven shaft 16 through planetary gearing 50 to output shaft 81. It will be noted that with the manual control valve 170 positioned for "reverse" drive that line pressure fluid from supply conduit 191 will not be directed through conduit 205 into the chamber 187c of the pressure regulator valve body 187 therefore the pressure regulator valve 185 will function in such a manner as to cause an increased pressure (180 p. s. i.) to be applied to the "reverse" band servo 59 instead of the 90 p. s. i. used for application of forward servo 69. The increased pressure in servo 59 is necessary to take the higher torque reaction applied to the band 62 as a result of the gear ratio of the reverse planetary 50. The operation of the pressure regulator valve 185 is fully explained in the aforementioned William L. Sheppard application, Serial No. 98,493.

In addition to providing a gear ratio for coast braking this transmission unit includes mechanism such that either of two forms of turbo-braking may be brought into operation to assist the engine braking that may be obtained when the transmission unit is conditioned for the transmission of direct drive. From Fig. 6 it will be noted that a manually operable control lever 221 may be operated by suitable control linkage 222 in such a manner that the beam lever 223 may be rocked about its fulcrum point 224. Movement of lever 221 towards the left will rock beam 223 into engagement with and cause actuation of the brake band applying mechanism 225 of reverse drive servo 59. Actuation of mechanism 225 will apply the brake band 52 to reverse drive planetary gearing 50 at a time when the transmission unit is transmitting a forward direct drive through the engaged clutch C and intermediate solid shaft 30. Application of brake band 52 at a time when the clutch C is engaged for the transmission of a forward direct drive causes the converter turbine member 15 to be driven in a reverse direction from the direction of rotation of the converter impeller member 14 and energy is accordingly dissipated in the converter unit A in a manner that effectively brakes the speed of the impeller 13 and the output shaft 81. If a less effective turbo-brake is required then lever 221 may be rocked to the right to cause beam lever 223 to engage and actuate the brake band applying mechanism 226 of the forward drive servo 69 so as to apply the brake band 62 to the forward drive planetary gearing 60. Application of band 62 at a time when the transmission unit is transmitting direct drive through the engaged clutch C will drive the converter turbine member 15 forwardly at a different rate of speed than the speed of the converter impeller member 14 and therefore energy will be dissipated in the converter unit A and the output shaft 81 will be braked. Obviously the brake provided by application of the forward drive brake band 62 is not as effective as that provided by the application of the reverse drive brake band 52 for the relative directions of rotation of the impeller 14, and the turbine 15 are not opposed to one another when band 62 is applied whereas application of band 52 during forward direct drive produces opposed rotation of members 14 and 15. While manually operated mechanical means 221—226 are shown in Fig. 6 for operation of the servos 59 and 69 to accomplish the turbo braking, it is considered within the scope of this invention to substitute pneumatic, hydraulic or similarly operated mechanisms for the linkage means 221—226.

It is thought to be obvious from the foregoing description that there is provided an improved, highly flexible, simplified type of motor vehicle power transmission unit that provides all the necessary gear ratios and control features for maximum performance and driving comfort and yet permits manufacture and assembly at an economical figure.

I claim:

1. In a drive train including an engine driven power transmission unit and an engine throttle control, an engine driven input shaft, an output shaft, a hydraulic torque converter unit mounted therebetween comprising operatively associated impeller, turbine and reaction wheels, means drivingly connecting said input shaft and said impeller wheel, a planetary gear train, comprising an annulus gear, a sun gear and a planet pinion carrier mounting planet pinion gears, interposed between said converter unit and said output shaft, means drivingly connecting said turbine wheel to said annulus gear, drive transmitting means connecting said planet pinion carrier to said output shaft, brake means adapted to anchor said sun gear against rotation so as to activate said gear train and provide means for the transmission of a combination hydraulically and mechanically transmitted, torque multiplying, underdrive to said output shaft, a clutch means adapted to be connected between said input and output shafts to provide means for the transmission of a positive, direct drive therebetween, and differential pressure fluid operated control means operatively associated with said brake means and said clutch means to automatically and alternately apply and release the said brake and clutch means to thereby automatically effect the transitions between underdrive and direct drive, said control means including a source of pressure fluid responsive to the speed of the output shaft, a source of pressure fluid responsive to the opening of the engine throttle and a differential pressure operated valve connected to said sources of variable pressure and actuable by the pressure differential therebetween to automatically operate said clutch and brake means.

2. In an engine driven motor vehicle drive train including an engine throttle control and a power transmission unit drivingly connected to the engine comprising, an input shaft, an output shaft, a hydraulic torque converter unit mounted therebetween comprising operatively associated impeller, turbine and reaction wheels, means drivingly connecting said input shaft and said impeller wheel, a planetary gear train, comprising an annulus gear, a sun gear and a planet pinion carrier mounting planet pinion gears, interposed between said converter unit and said output shaft, means drivingly connecting said turbine wheel to said annulus gear, drive transmitting means connecting said planet pinion carrier to said output shaft, brake means adapted to anchor said sun gear against rotation so as to activate said gear train and provide means for the transmission of a combination hydraulically and mechanically transmitted, torque multiplying, underdrive from said input to said output shaft, a clutch means adapted to be connected between said input and output shafts to provide means for the transmission of a positive, direct drive therebetween, control means operatively associated with said brake means and said clutch means to automatically and alternately apply and release the said brake and clutch means to thereby effect the automatic transitions between underdrive and direct drive, said automatically operable control means including a source of pressure fluid responsive to the speed of the vehicle, pressure fluid operated means responsive to the movement of the engine throttle, and a differential pressure operated valve connected to said brake and clutch means and to said sources of pressure fluid and adapted to be operated by the pressure differential therebetween to accomplish the automatic transitions between underdrive and direct drive.

3. In a drive train including an engine driven power transmission unit and an engine throttle control, an engine driven input shaft, an output shaft, a hydraulic torque converter unit mounted therebetween comprising operatively associated impeller, turbine and reaction wheels, means drivingly connecting said input shaft and said impeller wheel, a planetary gear train, comprising an annulus gear, a sun gear and a planet pinion carrier mounting planet pinion gears, interposed between said converter unit and said output shaft, means drivingly connecting said turbine wheel to said annulus gear, drive transmitting means connecting said planet pinion carrier to said output shaft, brake means adapted to anchor said sun gear against rotation so as to activate said gear train and provide means for the transmission of a combination hydraulically and mechanically transmitted, torque multiplying, underdrive to said output shaft, a clutch means adapted to be connected between said input and output shafts to provide means for the transmission of a positive, direct drive therebetween, pressure fluid operated control means operatively connected with said brake means and said clutch means to automatically and alternately apply and release the said brake and clutch means to thereby automatically effect the transitions between underdrive and direct drive, said control means including a source of pressure fluid responsive to the speed of the output shaft, a source of pressure fluid responsive to the opening of the engine throttle and a differential pressure operated valve connected to said sources of variable pressure and actuable by the pressure differential therebetween to automatically operate said clutch and brake means, and manually operable pressure fluid control means connectible with said differential pressure operated valve adapted to overrule the automatically operable control means and actuate said brake and clutch means to effect a downshift from direct drive to the torque multiplying underdrive at the will of the operator.

4. In a drive train including an engine driven power transmission unit and an engine throttle control, an input shaft drivingly connected to said engine, an output shaft, a hydraulic torque converter unit mounted therebetween comprising operatively associated impeller, turbine and reaction wheels, means drivingly connecting said input shaft and said impeller wheel, a planetary gear train, comprising an annulus gear, a sun gear and a planet pinion carrier mounting planet pinion gears, interposed between said converter unit and said output shaft, means drivingly connecting said turbine wheel to said annulus gear, drive transmitting means connecting said planet pinion carrier to said output shaft, brake means adapted to anchor said sun gear against rotation so as to activate said gear train and provide means for the transmission of a combination hydraulically and mechanically transmitted, torque multiplying, underdrive to said output shaft, a clutch means adapted to be connected between said input and output shafts to provide means for the transmission of a positive, direct drive therebetween, pressure fluid operated control means operatively associated with said brake means and said clutch means to automatically and alternately apply and release the said brake and clutch means to thereby automatically effect the transitions between underdrive and direct drive, said control means including a source of pressure fluid responsive to the speed of the output shaft, a source of pressure fluid responsive to the opening of the engine throttle and a differential pressure operated valve connected to said sources of variable pressure and actuable by the pressure differential therebetween to automatically operate said clutch and brake means, a first manually operable pressure fluid control means connectible with said differential pressure operated valve adapted to overrule the automatically operable control means to provide for continuous operation of the transmission unit in the underdrive ratio regardless of the speed of the output shaft and the throttle opening, and a second manually operable control means associated with the said brake means adapted to engage said brake means when said transmission unit is transmitting direct drive to thereby provide a turbo-brake effect in said converter for the output shaft.

5. In a drive train for a motor vehicle having an engine, an engine throttle control and a drive selector lever, a power transmission unit including an engine driven input shaft, an output shaft, a hydraulic torque converter unit comprising operatively associated impeller, turbine and reaction wheels, means drivingly connecting said input shaft and said impeller wheel, a planetary gear train, comprising an annulus gear, a sun gear and a planet pinion carrier mounting planet pinion gears, interposed between said converter unit and said output shaft, means drivingly connecting said turbine wheel to said annulus gear, drive transmitting means connecting said planet pinion carrier to said output shaft, brake means adapted to anchor said sun gear against rotation so as to activate said gear train and provide means for the transmission of a combination hydraulically and mechanically transmitted, torque multiplying, forward, underdrive from said input shaft to said output shaft, a clutch means within said converter unit adapted to connect said input and output shafts for the transmission of a positive, forward, direct drive, automatically operable pressure fluid operated control means adapted to operate said brake and clutch means to effect automatic upshifting from said underdrive to said direct drive, and to automatically downshift said direct drive to said underdrive, said automatically operable control means including a source of pressure fluid responsive to the speed of the vehicle, pressure fluid operated means responsive to the movement of the engine throttle, and a differential pressure operated valve connected to said brake and clutch means and to said sources of pressure fluid and adapted to be operated by the pressure differential therebetween to accomplish the automatic transitions between underdrive and direct drive, engine throttle actuated pressure fluid operated control means to manually overrule said automatically operable control means and effect a downshift from the direct drive ratio to the underdrive ratio at the will of the operator, and drive selector lever actuated pressure fluid operated control means to manually effect a downshift from the direct drive ratio to the underdrive ratio.

6. In a drive train for a motor vehicle having an engine, an engine throttle control and a drive selector lever, a power transmission unit including an engine driven input shaft, an output shaft, a hydraulic torque converter unit comprising operatively associated impeller, turbine and reaction wheels, means drivingly connecting said input shaft and said impeller wheel, a planetary gear train, comprising an annulus gear, a sun gear and a planet pinion carrier mounting planet pinion gears, interposed between said converter unit and said output shaft, means drivingly connecting said turbine wheel to said annulus gear, drive transmitting means connecting said planet pinion carrier to said output shaft, brake means adapted to anchor said sun gear against rotation so as to activate said gear train and provide means for the transmission of a combination hydraulically and mechanically transmitted, torque multiplying, forward, underdrive from said input shaft to said output shaft, a clutch means within said converter unit adapted to connect said input and output shafts for the transmission of a positive, forward, direct drive, automatically operable pressure fluid operated control means adapted to operate said brake and clutch means to effect automatic upshifting from said underdrive to said direct drive, and to automatically downshift said direct drive to said underdrive, said automatically operable control means including a source of pressure fluid responsive to the speed of the vehicle, pressure fluid operated means responsive to the movement of the engine throttle, and a differential pressure operated valve connected to said brake and clutch means and to said sources of pressure fluid and adapted to be operated by the pressure differential therebetween to accomplish the automatic transitions between underdrive and direct drive, engine throttle movement actuated, pressure fluid operated control means to manually overrule said automatically operable control means and effect a downshift from the direct drive ratio to the underdrive ratio at the will of the operator, drive selector lever actuated, pressure fluid operated control means to manually effect a downshift from the direct drive ratio to the underdrive ratio, and additional manually operable control means to apply the brake means while the clutch means is transmitting a direct drive between said input and output shafts to thereby provide for converter turbo-braking of the output shaft.

7. In a motor vehicle drive train including an engine, an engine throttle control and a power transmission unit driven by the engine comprising, an input shaft, an output shaft, a hydraulic torque converter unit comprising operatively associated impeller, turbine and reaction wheels, means drivingly connecting said input shaft and said impeller wheel, first and second planetary gear trains, each comprising operatively associated annulus, sun and planet pinion gears and a planet pinion gear carrier, interposed between said converter unit and said output shaft, drive transmitting means connecting said turbine wheel to the annulus gear of said first planetary gear train and to the sun gear of said second planetary gear train, drive transmitting means connecting the planet pinion carrier of said first planetary gear train and the annulus gear of said second planetary gear train to said output shaft, brake means adapted to anchor the sun gear of said first planetary gear train against rotation so as to provide means for transmitting a combination hydraulically and mechanically transmitted, forward, underdrive from said input shaft to said output shaft, brake means adapted to anchor the planet pinion carrier of said second planetary gear train against rotation so as to provide means for the transmission of a combination hydraulically and mechanically transmitted reverse drive from said input shaft to said output shaft, a clutch means adapted to connect said input and output shafts for the transmission of a positive, forward, direct drive, and pressure fluid operated automatically operable control means associated with the brake means of said first planetary gear train and said clutch means to provide means for the initiation of all forward drive through said underdrive after which automatic upshifts to direct drive and automatic downshifts from direct drive will be automatically accomplished in accordance with the variations in speed of said output shaft and the movement of the engine throttle control, said automatically operable pressure fluid operated control means comprising a first variable pressure fluid wherein the pressure is responsive to the speed of the output shaft, a second variable pressure fluid wherein the pressure is responsive to the degree of engine throttle opening, a third pressure fluid of substantially constant pressure, and a differential pressure operated control valve connected to said three pressure fluids and arranged to be operated by the pressure differential between said first and second pressure fluids whereby the third pressure fluid is applied to the controls for said clutch and the brake means for said first planetary gear train to accomplish automatic changes in speed ratio drive.

8. In a drive train, an engine, an engine throttle control and an engine driven power transmission unit comprising, an input shaft, an output shaft, a hydraulic torque converter unit comprising operatively associated impeller, turbine and reaction wheels, means drivingly connecting said input shaft and said impeller wheel, first and second planetary gear trains, each comprising operatively associated annulus, sun and planet pinion gears and a planet pinion gear carrier, interposed between said converter unit and said output shaft, drive transmitting means connecting said turbine wheel to the annulus gear of said first planetary gear train and to the sun gear of said second planetary gear train, drive transmitting means connecting the planet pinion carrier of said first planetary gear train and the annulus gear of said second planetary gear train to said output shaft, brake means adapted to anchor the sun gear of said first planetary gear train against rotation so as to provide means for transmitting a combination hydraulically and mechanically transmitted, forward, underdrive from said input shaft to said output shaft, brake means adapted to anchor the planet pinion carrier of said second planetary gear train against rotation so as to provide means for the transmission of a combination hydraulically and mechanically transmitted reverse drive from said input shaft to said output shaft, a clutch means adapted to connect said input and output shafts for the transmission of a positive, forward, direct drive, and pressure fluid actuated automatically operable control means associated with the brake means of said first planetary gear train and said clutch means to provide means for the initiation of all forward drive through said underdrive after which automatic upshifts to direct drive and automatic downshifts from direct drive will be accomplished in accordance with variations in the speed of said output shaft and the movement of the engine throttle control, said automatically operable pressure fluid operated control means comprising a first variable pressure fluid wherein the pressure is responsive to the speed of the output shaft, a second variable pressure fluid wherein the pressure is responsive to the degree of engine throttle opening, a third pressure fluid of substantially constant pressure, and a differential pressure operated control valve connected to said three pressure fluids and arranged to be operated by the pressure differential between said first and second pressure fluids whereby the third pressure fluid is applied to the controls for said clutch and the brake means for said first planetary gear train to accomplish automatic changes in speed ratio drive and manually operable control means to effect application of said brake means for said first or second planetary gear trains while direct drive is being transmitted such that a turbo-brake for said output shaft is obtainable.

9. In a drive train, an engine, an engine throttle control and an engine driven power transmission unit comprising, an input shaft, an output shaft, a hydrodynamic coupling including impeller, turbine and reaction elements interposed between said input and output shafts, said impeller element being drivingly connected to said input shaft, a first intermediate hollow shaft drivingly connected to said turbine element, a second intermediate shaft arranged concentrically within and rotatable relative to said first intermediate shaft, a clutch means having engageable driving and driven elements carried by said input shaft and said second intermediate shaft respectively, a forward drive planetary gear train comprising a sun gear, brake means therefore, an annulus gear, planet pinion gearing, and a carrier for the planet pinion gearing, means drivingly connecting the first intermediate shaft to the annulus gear of the forward drive gear train, means drivingly connecting the planet pinion carrier of the forward drive gear train to the second intermediate shaft, means drivingly connecting the second intermediate shaft to the output shaft and pressure fluid operated automatically operable control means to alternately apply the brake means for the forward drive planetary sun gear and to effect engagement of the clutch means, said automatically operable pressure fluid operated control means comprising a first variable pressure fluid wherein the pressure is responsive to the speed of the output shaft, a second variable pressure fluid wherein the pressure is responsive to the degree of engine throttle opening, a third pressure fluid of substantially constant pressure, and a differential pressure operated control valve connected to said three pressure fluids and arranged to be operated by the pressure differential between said first and second pressure fluids whereby the third pressure fluid is applied to the controls for said clutch and the brake means for said first planetary gear train to accomplish automatic changes in speed ratio drive.

10. In a drive train, an engine, an engine throttle control and an engine driven power transmission unit comprising, an input shaft, an output shaft, a hydrodynamic coupling including impeller, turbine and reaction elements interposed between said input and output shafts, said impeller element being drivingly connected to said input shaft, a first intermediate hollow shaft drivingly connected to said turbine element, a second intermediate shaft arranged concentrically within and rotatable relative to said first intermediate shaft, a clutch means having engageable driving and driven elements carried by said input shaft and said second intermediate shaft respectively, a forward drive planetary gear train comprising a sun gear, brake means therefore, an annulus gear, planet pinion gearing, and a carrier for the planet pinion gearing, means drivingly connecting the first intermediate shaft to the annulus gear of the forward drive gear train, means drivingly connecting the planet pinion carrier of the forward drive gear train to the second intermediate shaft, means drivingly connecting the second intermediate shaft to the output shaft and pressure fluid operated automatically operable control means to alternately apply the brake means for the forward drive planetary sun gear, said automatically operable pressure fluid operated control means comprising a first variable pressure fluid wherein the pressure is responsive to the speed of the output shaft, a second variable pressure fluid wherein the pressure is responsive to the degree of engine throttle opening, a third pressure fluid of substantially constant pressure, and a differential pressure operated control valve connected to said three pressure fluids and arranged to be operated by the pressure differential between said first and second pressure fluids whereby the third pressure fluid is applied to the controls for said clutch and the brake means for said first planetary gear train to accomplish automatic changes in speed ratio drive and to effect engagement of the clutch means, and manually operable control means to overrule said automatically operable control means to simultaneously effect disengagement of the clutch means and engagement of the brake means for the forward drive gear train to establish drive through an underdrive ratio at times when the automatically operable control means would normally establish direct drive.

11. In a drive train, an engine, an engine throttle control, and an engine driven power transmission unit comprising, an input shaft, an output shaft, a hydrodynamic coupling including impeller, turbine and reaction elements interposed between said input and output shafts, said impeller element being drivingly connected to said input shaft, a first intermediate hollow shaft drivingly connected to said turbine element, a second intermediate shaft arranged concentrically within and rotatable relative to said first intermediate shaft, a clutch means having engageable driving and driven elements carried by said input shaft and said second intermediate shaft respectively, a forward drive planetary gear train comprising a sun gear, brake means therefore, an annulus gear, planet pinion gearing, and a carrier for the planet pinion gearing, means drivingly connecting the first intermediate shaft to the annulus gear of the forward drive gear train, means drivingly connecting the planet pinion carrier of the forward drive gear train to the second intermediate shaft, means drivingly connecting the second intermediate shaft to the output shaft and pressure fluid operated automatically operable control means to alternately apply the brake means for the forward drive planetary sun gear and to effect engagement of the clutch means, said automatically operable pressure fluid operated control means comprising a first variable pressure fluid wherein the pressure is responsive to the speed of the output shaft, a second variable pressure fluid wherein the pressure is responsive to the degree of engine throttle opening, a third pressure fluid of substantially constant pressure, and a differential pressure operated control valve connected to said three pressure fluids and arranged to be operated by the pressure differential between said first and second pressure fluids whereby the third pressure fluid is applied to the controls for said clutch and the brake means for said first planetary gear train to accomplish automatic changes in speed ratio drive, and manually operable control means to apply the brake band for the sun gear of the forward drive planetary gear train while the clutch means is engaged to provide a converter generated turbo brake for direct drive.

12. In a drive train, an engine, an engine throttle control, and an engine driven transmission unit, comprising, an input shaft, an output shaft, a hydrodynamic coupling including impeller, turbine and reaction elements interposed between said input and output shaft, said impeller element being drivingly connected to said input shaft, a first intermediate hollow shaft drivingly connected to said turbine element, a second intermediate shaft arranged concentrically within and rotatable relative to said first intermediate shaft, a clutch means having engageable driving and driven elements carried by said input shaft and said second intermediate shaft respectively, a forward drive planetary gear train comprising a sun gear, brake means therefore adapted to anchor same against rotation in at least one direction, an annulus gear, planet pinion gearing, and a carrier for the planet pinion gearing, means drivingly connecting the first intermediate shaft to the annulus gear of the forward drive gear train, means drivingly connecting the planet pinion carrier of the forward drive gear train to the second intermediate shaft, means drivingly connecting the second intermediate shaft to the output shaft, a reverse drive planetary gear train comprising a sun gear, an annulus gear, planet pinion gearing and a carrier for the planet pinion gearing, means drivingly connecting the first intermediate shaft to the sun gear of the reverse drive gear train, means drivingly connecting the annulus gear of the reverse drive gear train to the planet pinion carrier of the forward drive gear train, brake means adapted to be applied to the planet pinion carrier of the reverse drive gear train to anchor same against rotation in at least one direction and pressure fluid operated automatically operable control means to alternately apply the brake means for the forward drive planetary sun gear and to effect engagement of the clutch means, said automatically operable pressure fluid operated control means comprising a first variable pressure fluid wherein the pressure is responsive to the speed of the output shaft, a second variable pressure fluid wherein the pressure is responsive to the degree of engine throttle opening, a third pressure fluid of substantially constant pressure, and a differential pressure operated control valve connected to said three pressure fluids and arranged to be operated by the pressure differential between said first and second pressure fluid whereby the third pressure fluid is applied to the controls for said clutch and the brake means for said first planetary gear train to accomplish automatic changes in speed ratio drive.

13. In a drive train, an engine, an engine throttle control, and an engine driven power transmission unit comprising, an input shaft, an output shaft, a hydrodynamic coupling including impeller, turbine and reaction elements interposed between said input and output shafts, said impeller element being drivingly connected to said input shaft, a first intermediate shaft drivingly connected to said turbine element, a second intermediate shaft arranged concentrically around and rotatable relative to said first intermediate shaft, a clutch means having engageable driving and driven elements carried by said input shaft and said second intermediate shaft respectively, a first planetary gear train comprising a sun gear, an annulus gear, planet pinion gearing, and a carrier for the planet pinion gearing, means drivingly connecting the first intermediate shaft to the annulus gear, means drivingly connecting the planet pinion carrier to the second intermediate shaft, means drivingly connecting the second intermediate shaft to the output shaft, and brake means adapted to be applied to the sun gear of the forward drive gear train to anchor same against rotation in at least one direction, a source of constant intensity line pressure fluid, a source of variable pressure fluid responsive to the speed of the output shaft, a source of variable pressure fluid responsive to the engine throttle opening, and a differential pressure operated control valve connected to said sources of pressure fluid and to said clutch and brake means to automatically and alternately apply the brake means and the clutch means, and manually operable control means to effect disengagement of said clutch means and application of said brake means irrespective of the speed of the output shaft and the condition of the engine throttle.

14. In a drive train, an engine, an engine throttle control and an engine driven power transmission unit comprising, an input shaft, an output shaft, a hydraulic torque converter unit comprising operatively associated impeller, turbine and reaction wheels, means drivingly connecting said input shaft and said impeller wheel, first and second planetary gear trains, each comprising operatively associated annulus, sun and planet pinion gears and a planet pinion gear carrier, interposed between said converter unit and said output shaft, drive transmitting means connecting said turbine wheel to said first planetary gear train and said second planetary gear train, drive transmitting means connecting said first planetary gear train and said second planetary gear train to said output shaft, brake means adapted to be applied to said first planetary gear train so as to provide means for transmitting a combination hydraulically and mechanically transmitted, forward, underdrive from said input shaft to said output shaft, brake means adapted to be applied to said second planetary gear train so as to provide means for the transmission of a combination hydraulically and mechanically transmitted reverse drive from said input shaft to said output shaft, a clutch means adapted to connect said input and output shafts for the transmission of a forward, direct drive, pressure fluid operated automatically operable control means associated with the brake means of said first planetary gear train and said clutch means to provide means for the initiation of all forward drive through said underdrive after which automatic upshifts to direct drive and automatic downshifts from direct drive will be accomplished in accordance with the variations in speed of said output shaft and the movement of the engine throttle control, said automatically operable pressure fluid operated control means comprising a first variable pressure fluid wherein the pressure is responsive to the speed of the output shaft, a second variable pressure fluid wherein the pressure is responsive to the degree of engine throttle opening, a third pressure fluid of substantially constant pressure, and a differential pressure operated control valve connected to said three pressure fluids and arranged to be operated by the pressure differential between said first and second pressure fluids to direct the third pressure fluid to the controls for said clutch and the brake means for said first planetary gear train to accomplish automatic changes in speed ratio drive, and manually actuated, pressure fluid operable control means adapted to overrule said automatically operable control means by effecting actuation of said brake means of said first planetary gear train and said clutch means so as to provide means for the downshifting of said direct drive to said underdrive at the will of the operator.

15. In a drive train, an engine, an engine throttle control and an engine driven power transmission unit comprising, an input shaft, an output shaft, a hydraulic torque converter unit mounted therebetween comprising operatively associated impeller, turbine and reaction wheels, means drivingly connecting said input shaft and said impeller wheel, a planetary gear train, comprising an annulus gear, a sun gear and a planet pinion carrier mounting planet pinion gears, operatively connected and interposed between said converter unit and said output shaft, means drivingly connecting said turbine wheel to said gear train, drive transmitting means connecting said gear train to said output shaft, brake means adapted to be applied to said gear train so as to activate said gear train and provide means for the transmission of a combination hydraulically and mechanically transmitted, torque multiplying, underdrive from said input shaft to said output shaft, a clutch means adapted to be connected between said input and output shafts to provide means for the transmission of a direct drive therebetween, pressure fluid operated control means operatively associated with said brake means and said clutch means to automatically and alternately apply and release the said brake and clutch means to thereby effect the transitions between underdrive and direct drive, said automatically operable control means including a source of pressure fluid responsive to the speed of the output shaft, a source of pressure fluid operated means responsive to the movement of the engine throttle, and a differential pressure operated valve connected by pressure fluid means to said brake and clutch means and to each of said sources of pressure fluid and arranged to be operated by the pressure differential resulting from the simultaneous application of pressurized fluid from each of said pressure fluid sources to opposed portions of said valve to automatically effect speed ratio changes between the aforementioned underdrive and direct drive.

JOSEPH JANDASEK.

References Cited in the file of this patent

UNITED STATES PATENTS

| Number | Name | Date |
|---|---|---|
| 2,088,782 | Ford et al. | Aug. 3, 1937 |
| 2,102,634 | Lysholm | Dec. 21, 1937 |
| 2,120,104 | Livermore | June 7, 1938 |
| 2,229,337 | Neracher et al. | Jan. 21, 1941 |
| 2,302,714 | Pollard | Nov. 24, 1942 |
| 2,329,724 | Maurer | Sept. 21, 1943 |
| 2,368,684 | Simpson | Feb. 6, 1945 |
| 2,418,378 | Voytech | Apr. 1, 1947 |
| 2,433,052 | Kelley | Dec. 23, 1947 |
| 2,456,328 | Schneider | Dec. 14, 1948 |
| 2,478,868 | Hasbany | Aug. 9, 1949 |
| 2,516,208 | Hasbany | July 25, 1950 |
| 2,518,825 | Simpson | Aug. 15, 1950 |
| 2,519,050 | Kelbel | Aug. 15, 1950 |

FOREIGN PATENTS

| Number | Country | Date |
|---|---|---|
| 267,079 | Great Britain | Feb. 18, 1932 |